Patented May 8, 1945

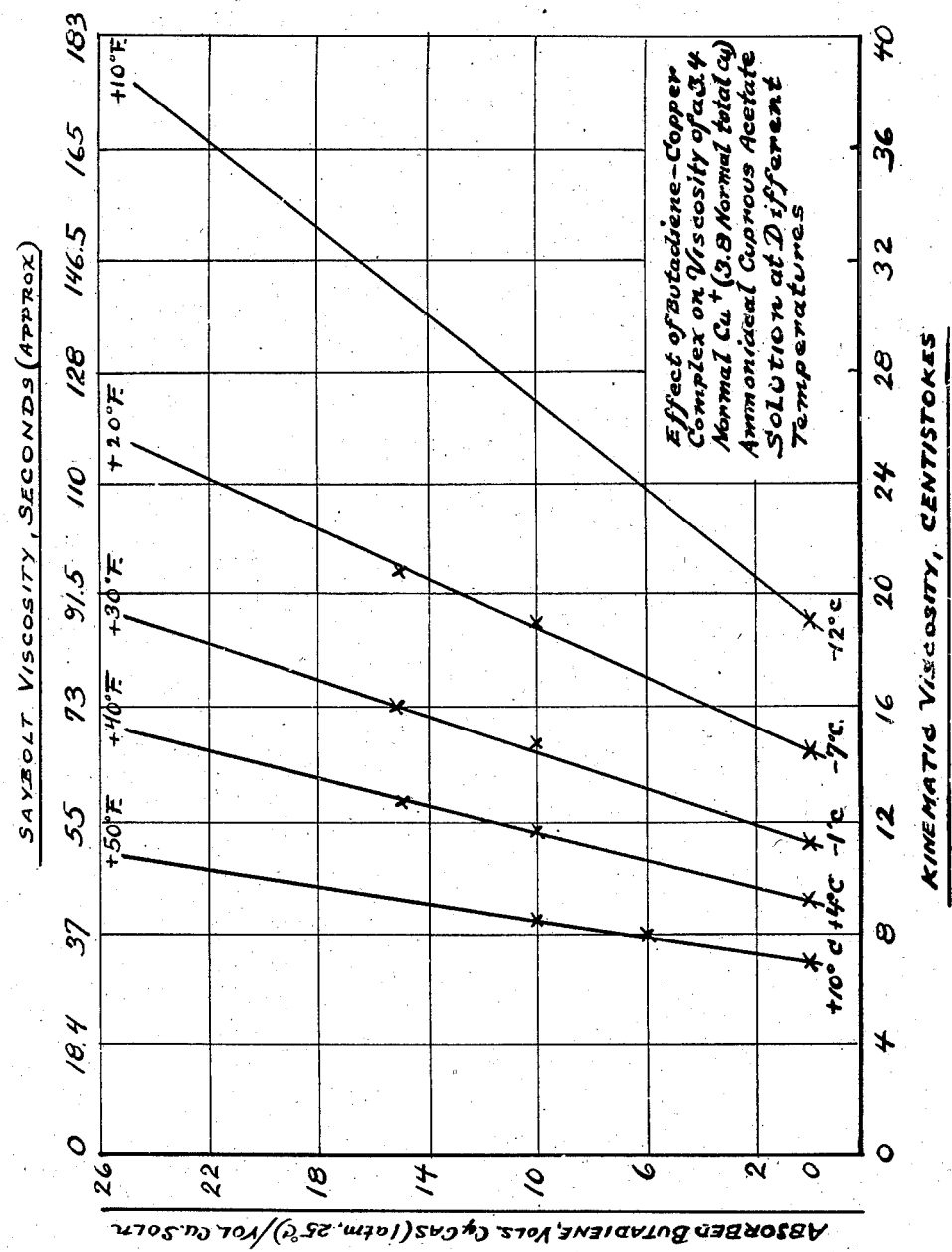

2,375,576

UNITED STATES PATENT OFFICE 2,375,576

METHOD OF SEPARATING AND CONCENTRATING BUTADIENE

Charles E. Morrell, Roselle, and Miller W. Swaney, Linden, N. J., assignors to Standard Oil Development Company, a corporation of Delaware Application July 22, 1942, Serial No. 451,840

4 Claims. (Cl. 260—681.5)

This invention relates to improvements in the separation and concentration of diolefins and particularly to the separation and concentration of diolefins using a cuprous salt solution as the absorbent.

The selective affinity of cuprous salt solutions for unsaturated hydrocarbons is well known and ammoniacal cuprous acetate solutions have been used for the preferential extraction of diolefins such as butadiene, from mixtures of hydrocarbons containing olefins and diolefins. The absorption of the diolefins in the cuprous salt solution was generally carried out by passing the hydrocarbon mixture as a gas through a liquid solution of the cuprous salt. One objection found in this process was that the saturation capacity of a cuprous salt solution decreases with increasing temperature, for example, the volumes of pure butadiene gas absorbed at 40° F. are 16 volumes for each volume of the cuprous salt solution, at 50° F. 15 volumes, at 70° F. 10 to 11 volumes, and at 100° F. 5 to 6 volumes.

Another disadvantage found in using this process was in the low amounts of diolefins absorbed per pass. Likewise, a substantial portion of diolefins were not absorbed by the cuprous salt solution, a substantial quantity remaining in the spent mixture.

When a hydrocarbon mixture, for example one composed of hydrocarbon where each hydrocarbon has only four carbon atoms to the molecule, is liquefied and passed through a liquid solution of a cuprous salt emulsification usually occurs. This emulsification slows up the process as the emulsions must be broken before a desired separation is obtained.

An object of this invention is to provide a method in which the volume of the diolefins separated from the hydrocarbon mixture is materially increased.

This and other objects will be understood on reading the following description.

According to this present method it was found if the hydrocarbon mixture is liquefied by the use of pressure or lowering of the temperature or a combination of the two and maintained in a continuous liquid phase, that cuprous salt solutions when passed through this liquid continuous phase of hydrocarbons, will absorb a larger quantity of the desired diolefins without forming undesirable emulsions, etc. It was also found that the diolefins absorbed in the cuprous salt solution on being expelled are of a higher concentration, that is, of at least 95% diolefins, for example when butadiene is separated from a mixture of hydrocarbons having 4 carbon atoms to the molecule.

The attached graph shows the effect of temperature, and of dissolved butadiene, on the viscosity of a 3.8 normal copper solution. It follows that solutions this viscous might eastily cause difficulties when employed as the continuous phase in liquid phase extractions. Contrasted to these very very high viscosities is the very low viscosity of $C_4$ hydrocarbons. The attached figure shows the viscosity of the copper solution at 0° C. to be about 11 centistokes. That for $C_4$ hydrocarbons under the same conditions is about 0.35 centistoke.

Therefore by employing $C_4$ as the continuous phase in a liquid-liquid extraction, the difficulties caused by the more viscous copper solutions tend to disappear.

The following examples will serve to illustrate the marked advantages of continuous $C_4$-phase extractions over continuous copper-phase extractions of butadiene-containing $C_4$ stocks.

EXAMPLE 1

The following liquid-phase extraction run was made in a steel tower packed with 1 inch Raschig rings. A continuous copper solution phase (an ammoniacal suprous acetate solution of 2.47 cuprous ion normality) was maintained and the $C_4$ feed dispersed therein. The summarized data follow:

Table 1

| Copper solution feed rate | Liquid $C_4$ feed rate | Butadiene in $C_4$ feed | Temp. of extraction | Butadiene in spent $C_4$ | $C_4$ dissolved in the copper solution | Product purity percent butadiene | Cleanup of $C_4$ | Theor. saturation of copper solution |
|---|---|---|---|---|---|---|---|---|
| Gal./hr. 32 | Gal./hr. 5.2 | Per cent 26.2 | °F. 10–20 | Per cent 8.6 | Cu. ft./gal. 0.99. | Per cent 92.5 | Per cent 70–75 | Per cent 45 |

These data indicate that no improvement in the extraction of diolefin is obtainable over that obtained with the gas phase extraction of butadiene from $C_4$ cuts with similar copper solutions. However, the next example shows the improvement afforded by continuous $C_4$ phase extractions.

EXAMPLE 2

The following liquid phase countercurrent extraction runs were made in a packed tower with 1 inch Raschig rings. These data show marked improvements in per cent of $C_4$ cleanup, per cent saturation of solution, and product purity, as well as increased feed rates, obtained by maintaining the liquid $C_4$ as the continuous phase and by dispersing the copper solution therein. Other methods such as turbine type mixers may be used to contact the hydrocarbons and the cuprous solution.

Table 2

| Cu. soln. Cu+ norm. | Solution feed rate | Liq. C₄ feed rate | Per cent butadiene in C₄ feed | Temp. of extraction | Per cent butadiene in spent C₄ | C₄ dissolved by soln. | Product purity (per cent C₄H₆) | Per cent of C₄ cleanup | Per cent theor. satn. of solution |
|---|---|---|---|---|---|---|---|---|---|
| | Gals./hr. | Gals./hr. | | °F. | | Cu. ft./gal. | | | |
| 2.7 | 57 | 8.6 | 30.3 | 16–34 | 2.4–3.4 | 1.12 | 96.5 | 94 | 76 |
| 2.7 | 54 | 7.4 | 29.2 | 10–32 | 0.2 | 1.25 | 95.0 | 99 | 83 |
| 2.6 | 65 | 9.9 | 29.7 | 17–34 | 3.4 | 1.23 | 94.2 | 91 | 84 |

We claim:

1. The method of separating and concentrating butadiene which comprises, passing a hydrocarbon liquid that is normally gaseous at normal atmospheric temperatures in countercurrent flow with a cuprous salt solution by filling and continuously adding to and withdrawing from a vessel the liquid hydrocarbon as continuous phase, continuously adding and passing through the liquid hydrocarbon a cuprous salt solution as discontinuous phase, subjecting the separated cuprous salt solution to heat and separating butadiene.

2. The method according to claim 1 in which the cuprous salt solution is ammoniacal cuprous acetate.

3. The method of separating and concentrating a diolefin which comprises passing a hydrocarbon liquid containing a diolefin in countercurrent flow with a cuprous salt solution by filling and continuously adding to and withdrawing from a vessel the liquid hydrocarbon as continuous phase, continuously adding and passing through the liquid hydrocarbon a cuprous salt solution as discontinuous phase, subjecting the separated cuprous salt solution to heat and separating a diolefin.

4. The method of separating and concentrating a diolefin which comprises passing a hydrocarbon liquid containing a diolefin in countercurrent flow with a cuprous salt solution by filling and continuously adding to and withdrawing from a packed tower the liquid hydrocarbon as continuous phase, continuously adding and passing through the liquid hydrocarbon in the packed tower a cuprous salt solution as discontinuous phase, subjecting the separated cuprous salt solution to heat and separating a diolefin.

CHARLES E. MORRELL.
MILLER W. SWANEY.